United States Patent [19]

Zerlauth

[11] 4,228,838
[45] Oct. 21, 1980

[54] DEVICE FOR PREVENTING SKIDDING AND FOR INCREASING THE GRIP OF VEHICLE WHEELS ON ICE AND SNOW

[75] Inventor: Hellmuth Zerlauth, Innsbruck, Austria

[73] Assignee: Niveau AG, Basel, Switzerland

[21] Appl. No.: 957,099

[22] Filed: Nov. 3, 1978

[30] Foreign Application Priority Data

Nov. 9, 1977 [DE] Fed. Rep. of Germany ....... 2750111

[51] Int. Cl.³ .............................................. B60C 27/00
[52] U.S. Cl. .................................... 152/216; 156/221; 156/222; 156/228
[58] Field of Search ........... 152/216, 214, 221, 213 R, 152/213 A, 218, 222, 208, 178, 180, 190, 225 R, 225 C, 228; 180/15, 16; 301/46, 47

[56] References Cited

U.S. PATENT DOCUMENTS

| 2,581,770 | 1/1952 | Pittinger | 152/216 |
| 3,089,528 | 5/1963 | Aler | 152/216 |
| 3,133,581 | 5/1964 | Jenks | 152/216 |
| 3,861,752 | 1/1975 | Thurre et al. | 152/216 X |
| 4,120,336 | 10/1978 | Baskall | 152/221 X |

Primary Examiner—John T. Goolkasian
Assistant Examiner—Thomas Bokan
Attorney, Agent, or Firm—Toren, McGeady and Stanger

[57] ABSTRACT

The invention relates to an anti-skid device for vehicle wheels for travelling on ice and snow with a disc-like casing connected to the wheel rim with resilient-elastic anti-skid arms, constructed in such a way that in the position of use their ends can be swung out radially into the tire tread area while adapting to the rolling shapes of the tire and can be swung in when not in use, so that a device is obtained which can effortlessly be fitted whenever required, which is inexpensive to manufacture and which permits higher speeds than are possible when travelling with snow chains or spiked tires.

24 Claims, 11 Drawing Figures

DEVICE FOR PREVENTING SKIDDING AND FOR INCREASING THE GRIP OF VEHICLE WHEELS ON ICE AND SNOW

BACKGROUND OF THE INVENTION

The invention relates to a device for preventing skidding and for increasing the grip of vehicle wheels on ice and snow.

In addition to snow chains winter tires, also called adhesive tyres, are used for motor vehicles when travelling on snow-covered steep up and down gradients. Snow chains are not well liked because they are often difficult to fix to the vehicle tires and because they must be used in such a way that the road is not damaged, i.e. they must be removed on dry sections of the road following snow or ice-covered sections of the road. In addition, when travelling on dry roads snow chains are subject to a high degree of wear and also do not permit travel at high speed. In particular when roads become covered with ice at short notice, e.g. ice surfaces produced by drizzle falling on frozen road coverings it is hardly possible to use snow chains and winter tyres. Tyres covered with spikes are also not always usable.

In addition to snow chains and winter tyres starting aids are known, but these are not a substitute for snow chains and winter tyres. These starting aids, which merely comprise clamp straps fitted to the tyres, merely serve to permit a vehicle to be driven a short distance out of mud or snow.

BRIEF SUMMARY OF THE INVENTION

The problem of the present invention is therefore to provide a device which can be fitted to motor vehicle tyres and which can be used for preventing skidding and for increasing the grip of vehicle wheels on ice and snow, which can be used without difficulty whenever needed, which can be easily fitted to any vehicle wheel, whose manufacture is economic and permits higher speeds than when driving with snow chains or spiked tyres and which is much more effective than winter tires.

According to the invention this problem is solved by a device which permits skidding and increases the grip of vehicle wheels on ice and snow, wherein it comprises a hub cap-like and disc-like casing connected in fixed or detachable manner with the wheel rim with at least two anti-skid arms made from resilient-elastic materials, such as spring steel or the like arranged in said casing, whereby in the position of use the anti-skid arms radially and with their end portions in the tread area of the tyre are constructed so as to fixedly engage round the latter in its circumferential area in a zonal manner adapting to the rolling shape of the tire or constructed so as to be swung in or out by means of mechanical, pneumatic, hydraulic, electromotive operating mechanisms or the like, their ends being provided externally with a gripping profile.

The casing which can be fixed or fixedly connected to the wheel rim comprises a base disc which can be fixed to the wheel rim, carries a disc which is rotatable about its centre and keeps said disc at a distance accompanied by the formation of a gap-like space, whereby in said space and adjacent to its rotary edge the base disc has at least two anti-skid arms arranged at a uniform spacing from one another, which are pivotable in the vicinity of their articulation ends and projecting over the tire profile from the outer tire side in the swung out state, each anti-skid arm being made from spring steel and can be swung out from a tangential initial position into a radial position by means of a pivoted lever in the case of a manual or automatic rotation of the rotating disc in such a way that the free end of the anti-skid arms comes to rest between the tyre tread and its rolling surface, whereby each pivoted lever of the number of pivoted levers which corresponds to the number of anti-skid arms is articulated by one of its two ends to the rotating disc adjacent to its rotary edge, whilst the other end of the pivoted lever is connected in crank mechanism-like manner with the anti-skid arm for the purpose of the engagement of the gripping arms on the vehicle tire in the operating position, whilst the rotating disc which is rotatable by means of an operating mechanism is held in the pivoted out position of the anti-skid arm by means of a fixing and arresting device and can be automatically rotated back to the initial position by means of tension springs.

As a result of the device according to the invention a skid protection is obtained for vehicle wheels, together with improved grip of the wheels on ice and snow. Due to the fact that at least two radially directed anti-skid arms made from spring strip steel project from the outer side of the tire over the tire profile on rotating the tire the ends of the said arms come to rest between the tire profile and the rolling surface, such as the road or other substrate. To further increase grip the ends of the anti-skid arms are externally provided with a gripping profile which can also be in the form of spikes. It is easy to fit the anti-skid device because it is merely necessary to fit the disc-like casing to the rim and on operating the rotating disc the anti-skid arms are swung out of the inner area of the casing and engage elastically on the tire. In addition to a manual operation by means of a crank for the rotation of the rotating disc of the casing the swinging out of the anti-skid arms, which in the swung out position assume a half U-shape, there can also be a fully automatic swinging out of the anti-skid arms by means of corresponding actuating and drive mechanisms operable by means of a switch on the vehicle dashboard. The anti-skid arms can also be retracted in the same way. If in the extended state of the anti-skid arms the rotating disc is under spring tension, then only the fixing and arresting device for the rotating disc provided on the anti-skid device is operated, so that due to the spring tension the rotating disc is rotated and the anti-skid arms are swung in. On rotating the rotating disc the pivoted levers connected to the anti-skid arms bring about the swinging in and out of said arms, whereby the pivoted levers simultaneously bring about an application of the anti-skid arms to the tire profile with the arms in the swung out state.

Manufacture of the anti-skid device is inexpensive because it comprises few parts. If the anti-skid arms are swung in they do not form a hindrance when driving. The travelling behaviour is in no way impaired. When the anti-skid arms are swung out it is still possible to drive at high speed. During positioning and construction the anti-skid arms automatically adapt to the pressing movements of the tire. The anti-skid device permits quiet running and is neither prejudicial to the vehicle nor to the road. It takes up little space and can be constructed for most standard rims without rim changes being necessary.

Advantageous further developments of the invention can be gathered from the Subclaims.

According to a further development of the anti-skid device a manual operating mechanism for the rotating disc is provided which comprises an insertion opening in the rotating disc for a gear crank and a pitch circle rack in the area of the opening on the base disc, whereby the gear crank 82 has in its end area which passes through the opening a toothed gear which engages in the pitch circle rack. This operating device permits an effortless manual swinging out of the anti-skid arms.

An automatic swinging out of the anti-skid arms is made possible by an operating device for the rotating disc comprising a pitch circle-like rack arranged on the wall surface of the rotating disc facing the base disc and located in the space between the rotating disc and the base disc, said rack being in engagement with a toothed gear which passes through an opening provided in the base disc in the vicinity of the rack and connected to a drive mechanism fixedly connected to the wheel suspension.

According to a further embodiment of the invention the rotating disc can automatically be rotated from the swung out position of the anti-skid arms into its initial position.

For the purpose of securing the rotating disc with the anti-skid arms swung outwards a fixing and arresting device is provided, which is operable on the one hand manually and on the other by means of a correspondingly controlled drive mechanism.

BRIEF DESCRIPTION OF THE DRAWINGS

Exemplified and non-limitative embodiments of the invention are described hereinafter relative to the drawings, wherein show.

DETAILED DESCRIPTION OF THE PREFERRED EMBODIMENTS

Figure 1:
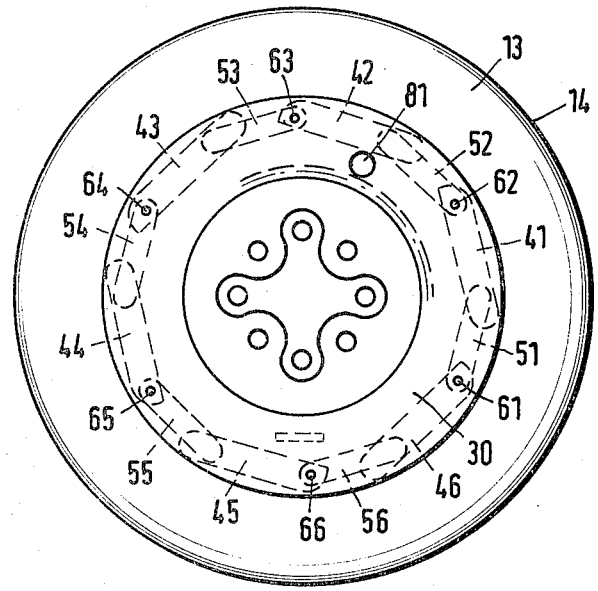
FIG. 1 a plan view of a vehicle tire with an anti-skid device with swung in anti-skid arms arranged on the rim.
Figure 2:
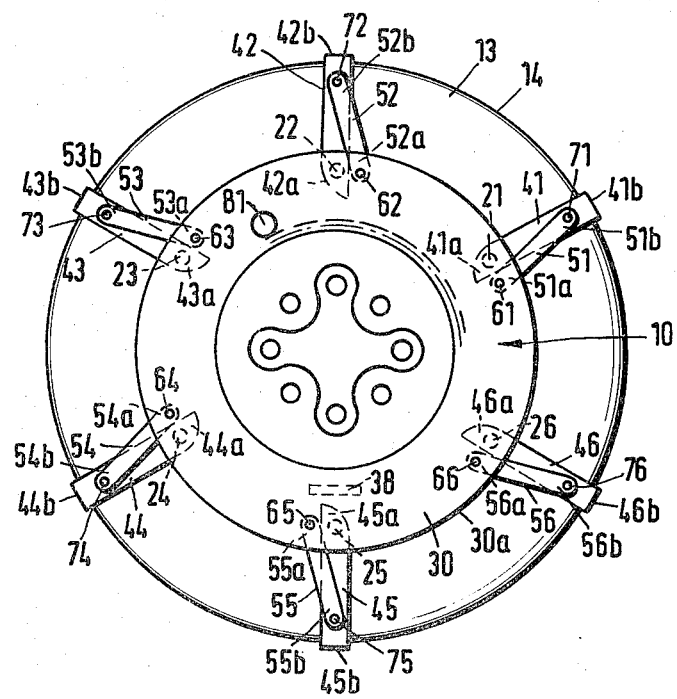
FIG. 2 a plan view of a vehicle tire with an anti-skid device with swung out anti-skid arms arranged on the rim.
Figure 7:
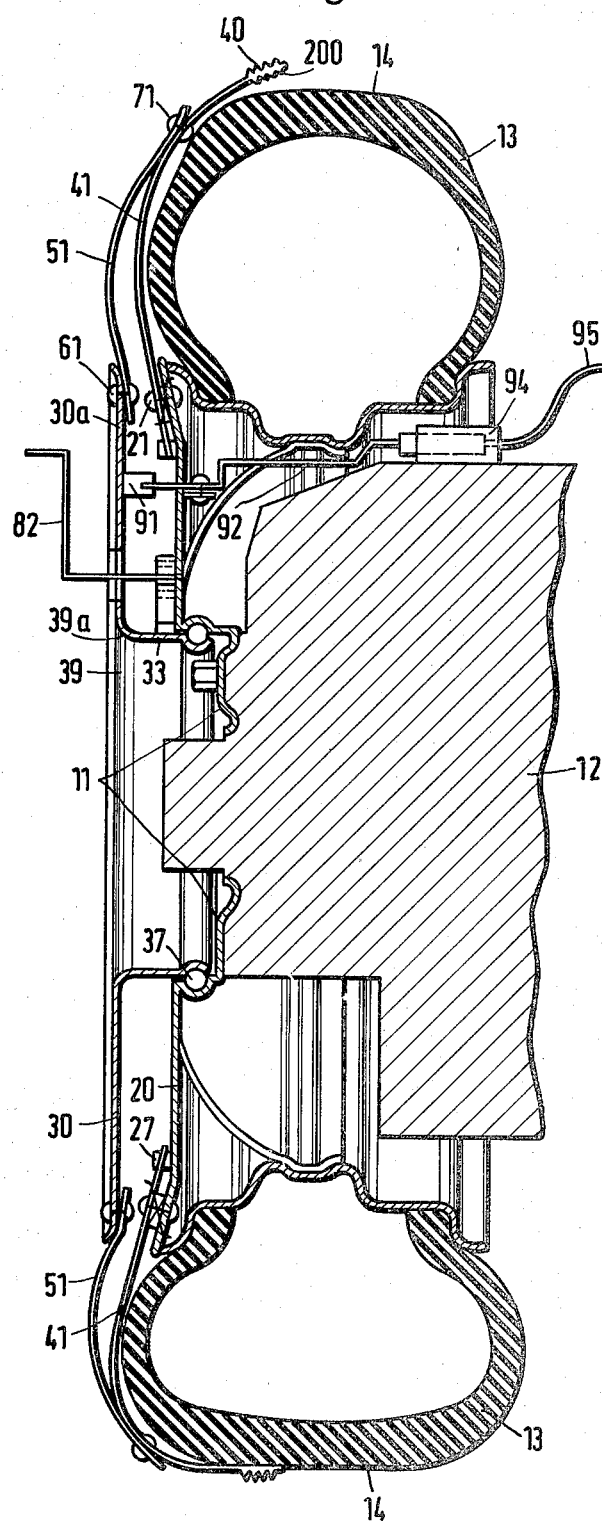
FIG. 7 a tire anti-skid device fixed to the wheel rim with an unloaded and a loaded tyre, partly in elevation and partly in vertical section.

As can be gathered from FIGS. 1 and 2 the anti-skid device 10 according to the invention comprises a casing 15 receiving anti-skid arms 41, 42, 43, 44, 45 and 46 which can be swung in and out and which is fixed to the rim 11 of a vehicle wheel 13. Rim 11 is provided with a brake part 12 (FIG. 7). The tread area of tyre 13 is designated by 14.

Casing 15 constructed in hub cap-like and disc-like manner comprises a circular base disc 20 and a rotating disc 30 which is rotatable about the centre of said base disc. Base disc 20 is fixed to rim 11 (FIG. 7). Base disc 20 can have a profile corresponding to the side face profile of the rim.

Rotating disc 30, which is held on base disc 20 by means of guides or the like and is rotatable in the direction of arrows X and X1 (FIG. 3) is constructed in cap-like manner and has a circulating, downwardly bent edge portion 33. In the centre rotating disc 30 has a circular opening 39 and a circulating edge portion 33 bent downwards in the direction of base disc 20 and bent downwards on the circulating edge 39a of opening 39 (FIG. 7). Rotating disc 30 is mounted on base disc 20, so that a gap-like space 35 is formed between rotating disc 30 and base disc 20. The inner wall surface of the rotating disc 30 which faces base disc 20 is designated as 32. The circulating downwardly bent edge portion 33 on rotating disc 30 is not formed in the area of the circulating edge 30a thereof, but adjacent to its centre 31, as can be gathered from FIGS. 7 and 8. The rotating disc 30 has a portion which projects beyond the circulating, downwardly bent rotating disc portion 33.

For the reliable guidance of rotating disc 30 on base disc 20, provided with openings for screwing the latter to rim 11, rotating disc 30 is guided on base disc 20 by means of a ball or roller bearing 37. For the purpose of receiving the ball or roller bearing 37 the circulating edge of the downwardly bent portion 33 of rotating disc 30 has a circulating groove or a plurality of grooves 36 facing a circulating recess or recessed portions 26 on base disc 20. The balls or rollers of the ball or roller bearing 37 are arranged in the inner space formed by the circulating groove 36 and the circulating recess 26. However the possibility also exists of providing rotating disc 30 in the area of its circulating edge 30a with the downwardly bent portion 33, so that a closed housing is formed with base disc 20. Corresponding openings are then provided in the circulating downwardly bent portion 33 for the extension and retraction of the anti-skid arms 41 to 46. The grooved portions 36 and the recessed portions 26 are preferably provided in the swung in area of the pivoted levers.

As can be gathered from FIGS. 1 and 2 six anti-skid arms 41 to 46 are provided in the casing in the present embodiment. However, the number of anti-skid arms can be selected at random. However, there must be at least two anti-skid arms. All anti-skid arms have the same relative spacing.

The end 41a, 42a, 43a, 44a, 45a and 46a of each individual anti-skid arm 41 to 46 is articulated to the base disc 20 at 21, 22, 23, 24, 25 and 26. The articulation points 21 to 26 are provided in the vicinity of the circulating edge of the base disc.

In order to be able to swing the anti-skid arms 41 to 46 about articulation points 21 to 26 pivoted levers 51, 52, 53, 54, 55 and 56 connected to the anti-skid arms 41 to 46 are provided. Each anti-skid arm is connected in crank mechanism-like manner with a pivoted lever. The end 51a, 52a, 53a, 54a, 55a and 56a of each pivoted lever 51 to 56 is fixed to the rotating disc 30 in the vicinity of its rotating edge 30a at 61, 62, 63, 64, 65 and 66 (FIG. 2). The in each case other pivoted lever end 51b, 52b, 53b, 54b, 55b and 56b is articulated at 71, 72, 73, 74, 75 and 76 to the anti-skid arm 41 to 46, so that the latter and the pivoted levers 51 to 56 assume the position shown in FIG. 1 with the anti-skid arms in the swung in position. If, however, rotating disc 30 is pivoted in the direction of arrow X1 (FIG. 3), anti-skid arms 41 to 46 are swung out of casing 15 by means of pivoted levers 51 to 56 and assume the position shown in FIG. 2.

Figure 3:
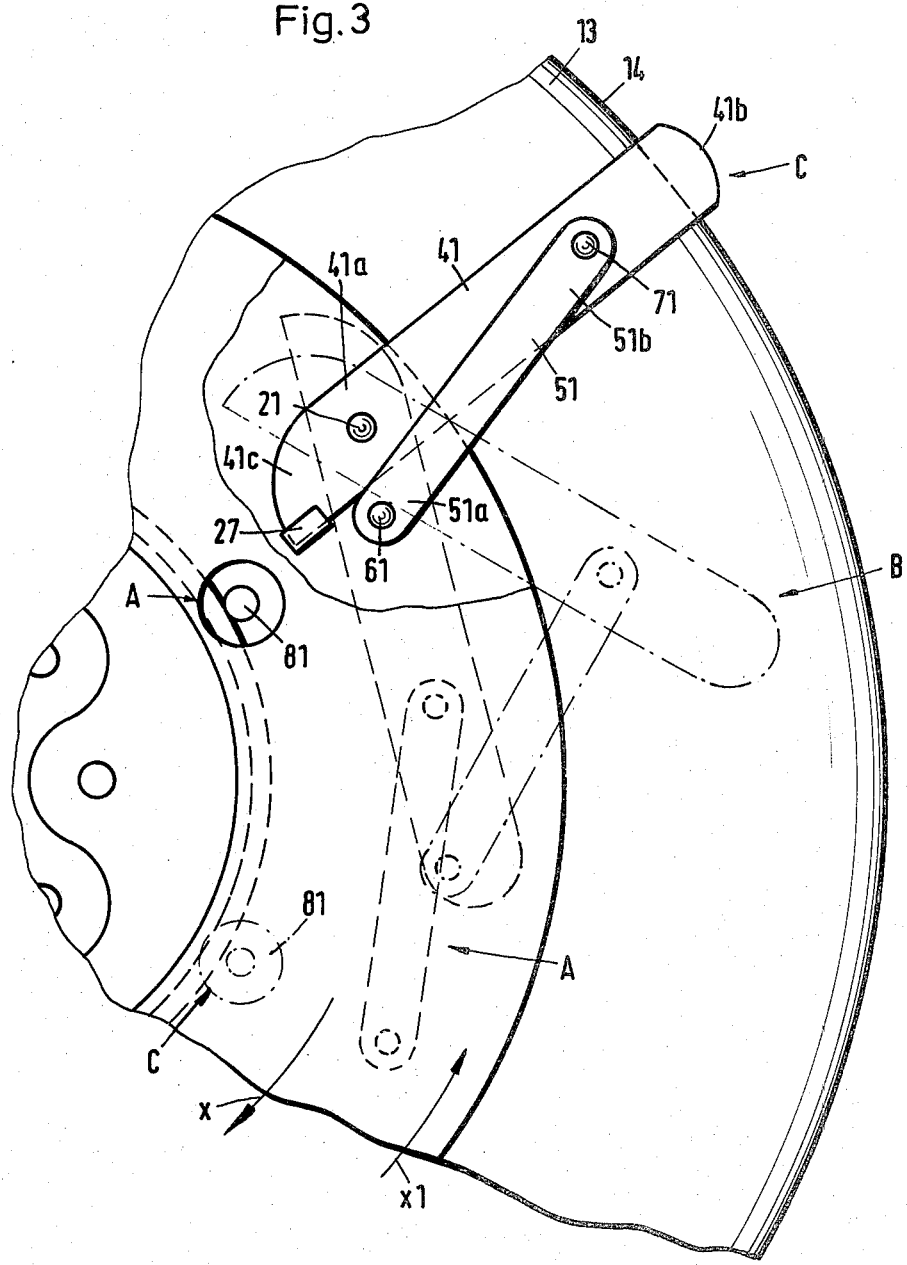
FIG. 3 a vehicle tire in a partial view with anti-skid arms in various positions.
Figure 8:
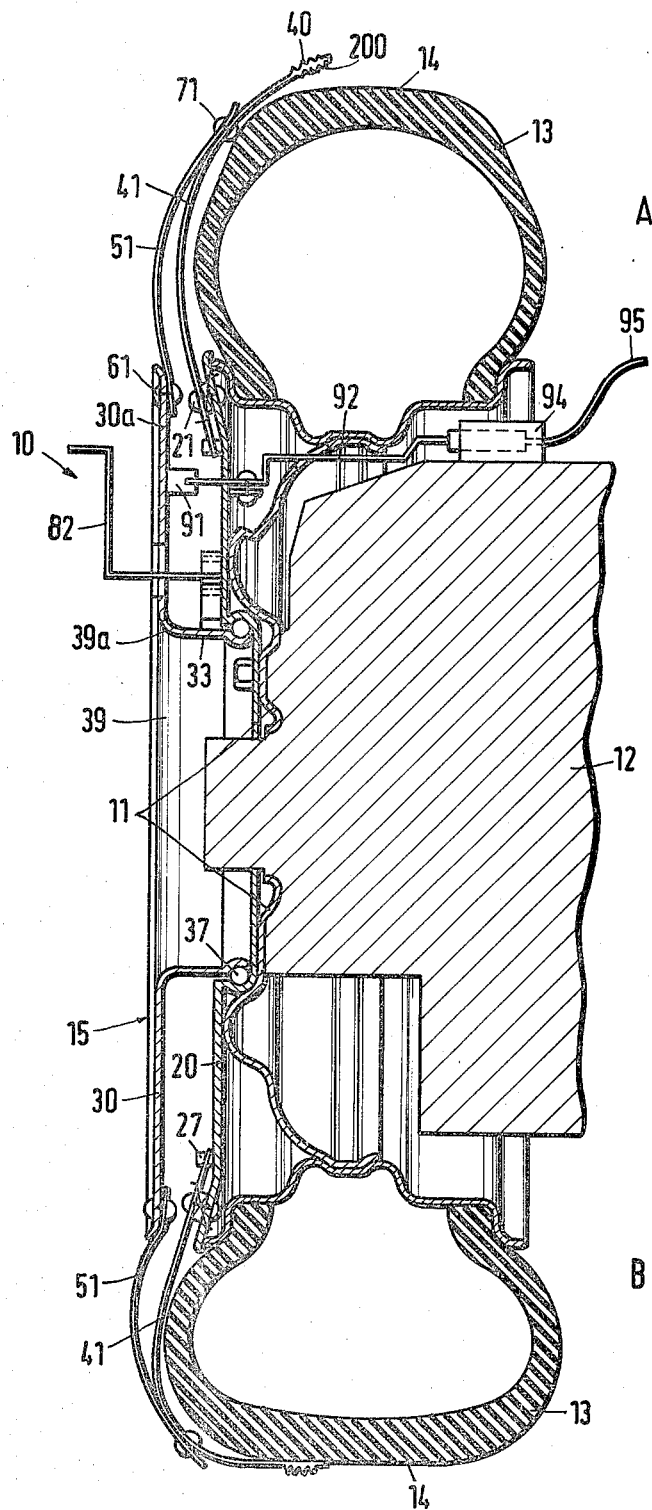
FIG. 8 a tire anti-skid device detachably connected to a rim and constructed as a component, in the case of an unloaded and a loaded tyre, partly in elevation and partly in vertical section.

The swinging in and out of anti-skid arms 41 to 46 is demonstrated in FIG. 3 relative to anti-skid arm 41 and the associated pivoted lever 51. In position A the anti-skid arm and the pivoted lever assume a swung in position. If the rotating disc 30 is rotated in the direction of arrow X1, the anti-skid arm 41 is pivoted beyond position B into the swung out position C, so that anti-skid arm 41 comes to rest laterally alongside tyre 13 and by its free end 41b zonally engages over the tread 14 of tyre 13 (FIGS. 7 and 8). In order to prevent in the case of a rotation of rotating disc 30 in direction X1 that the anti-skid arms 41 to 46 pass beyond radial position C, each anti-skid arm has a stop member 27 at its end 41a to 46a. So that said stop member 27 is fully effective each anti-skid arm 41 to 46 is constructed as a two-armed lever, as shown in FIG. 3. Portion 41c extended beyond articulation point 21 then carries the stop member 27. All the other anti-skid arms are constructed in the same way as anti-skid arm 41. In the swung out position the anti-skid arms 41 to 46 engage by means of their free ends 41b, 42b, 43b, 44b, 45b and 46b over the tread 14 of tire 13 (FIG. 2).

Each anti-skid arm 41 to 46 is made from a resilient-elastic material, such as for example spring steel, so that in addition to an adequate inherent elasticity it is also possible to bend down the free end portion 41b to 46b of each anti-skid arm 41 to 46 in the area of the tread 14 of the tire 13 by means of pivoted lever 51 to 56 so that the anti-skid arms can also be swung into the casing 15, because as a result of the resilient-elastic construction of the arms the latter can spring or deform back from the downwardly bent shape in the position of use into a rectilinear and planar shape on reaching the position of non-use.

In order to achieve this deformation of the anti-skid arms 41 to 46 in their end areas 41b to 46b, pivoted levers 51 to 56 are under a great initial tension, i.e. their length is made such that in the swung out state of the anti-skid levers 41 to 46 the latter assume the tyre deformation positions shown at A and B in FIGS. 7 and 8.

However, it is also possible to preshape the anti-skid arms 41 to 46, so that they have from the outset a slightly downwardly bent end position and consequently the anti-skid arms ends come to rest in the vicinity of tire tread 14 when the anti-skid arms 41 to 46 are extended. Due to the use of spring steel preshaped in this way it is possible to pivot back the arms into the casing 15, whereby they then assume an elongated shape. If the anti-skid arms are then swung out again they are deformed into an arcuate shape due to the resilience of the spring steel used.

It is also possible to use materials other than spring steel, so that pivoted levers 51 to 56 can also be made from spring wire or corresponding suitable synthetic materials.

The anti-skid arms 41 to 46 are detachably articulated to base disc 20, so that damaged or worn arms can be changed effortlessly.

At free ends 41b to 46b the anti-skid arms 41 to 46 have externally gripping profiles 40, so that an excellent grip is obtained. The gripping profile 40 shown in FIG. 7 may may be constructed as spikes.

Figure 4:
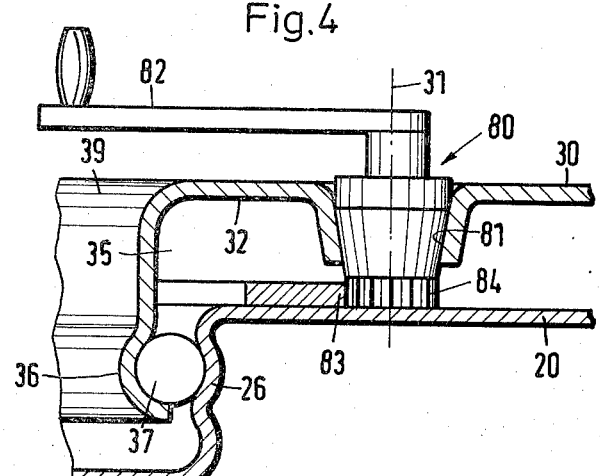
FIG. 4 the anti-skid device comprising a rotating disc and a base disc with a manually operable rotating disc operating mechanism, partly in partial view and partly in vertical section.

The rotating disc is provided with an operating mechanism 80 for the manual rotation thereof for the purpose of swinging in or out the anti-skid arms 41 to 46. According to FIGS. 3 and 4 the operating mechanism 80 has an insertion opening 81 in rotating disc 30 into which can be inserted a gear crank 82. In the vicinity of insertion opening 81 base disc 20 is provided with a pitch circle rack 83 fixed to a toothed gear 84 at the free end of the gear crank portion inserted through opening 81. If gear crank 82 is passed through opening 81, so that gear 84 engages with the pitch circle rack 83 rotating disc 30 can be rotated in the direction of arrow X or X1 in the case of a corresponding operation of gear crank 82 (FIG. 3).

Figure 5:
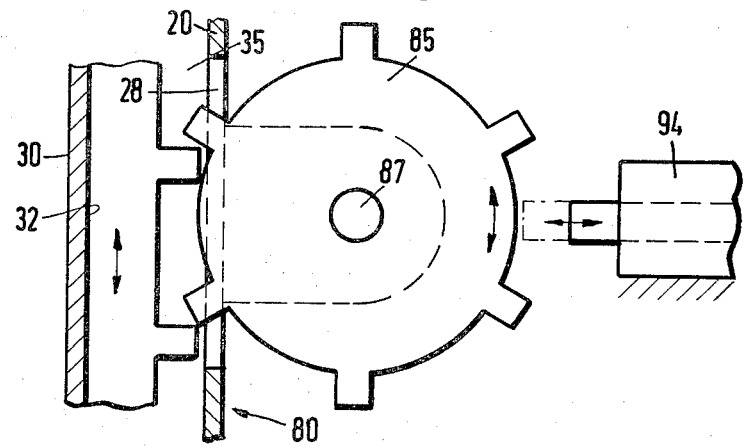
FIG. 5 the anti-skid device comprising a rotating disc and a base disc with an automatic rotating disc operating mechanism, partly in partial section and partly in vertical section.

FIGS. 5 and 8 show an automatic operating mechanism 80. In this embodiment the pitch circle rack 83 is arranged on the inner wall surface 32 of rotating disc 30. Rack 83 engages with toothed gear 85, mounted at 87 on base disc 20 and which by means of one portion engages through an opening 28 in base disc 20. Gear 85 is driven by means of a drive mechanism. The drive can be of an electromotive type, but other drives are possible. By means of the drive mechanism rotating disc 30 can be rotated in the direction of arrow X or X1.

Figure 6:
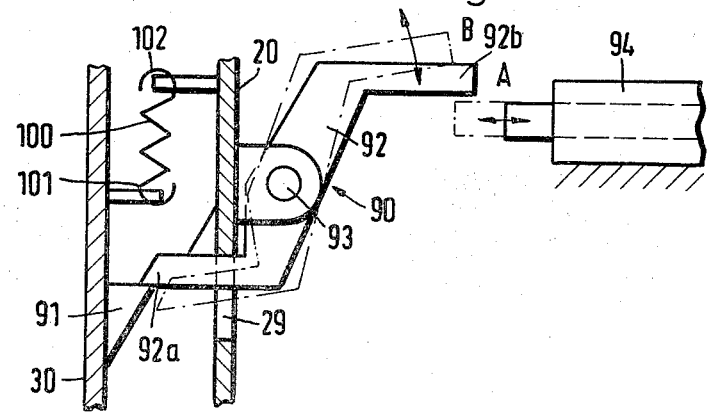
FIG. 6 the anti-skid device with the rotating disc fixing and arresting device, partly in partial section and partly in vertical section.

Tension springs 100 permit an automatic return of rotating disc 30 from the swung out position of the anti-skid arms into the swung in position thereof. These tension springs 100 are distributed over the circumference of rotating disc 30 and/or base disc 20 in such a way that each spring 100 is fixed by its one end 101 to rotating disc 30 and by its other end 102 to base disc 20 (FIG. 6). If rotating disc 30 has a position in which the anti-skid arms 41 to 46 are swung in, tension springs 100 are not under tension. If by means of gear crank 82 or drive mechanism 86 rotating disc 30 is rotated in the direction of arrow X1, so that the anti-skid arms 41 to 46 are swung out springs 100 are tensioned and attempt to spring back into their initial position, thereby rotating back rotating disc 30. To prevent an automatic rotating back of rotating disc 30 into its initial position a fixing and arresting device 90 is provided in casing 15. Device 90 comprises a stop cam 91 shaped onto the inner wall surface 32 of rotating disc 30 and a two-armed stop lever 92 pivotably mounted on base disc 20 at 93. In position A of FIG. 6 this two-armed stop lever 92 prevents a backward rotation of rotating disc 30 by acting on the stop cam 91. If, however, stop lever 92 is moved into position B, stop cam 91 is released from stop lever end 92a, so that tension springs 100 rotate rotating disc 30 in the direction of arrow X until the anti-skid arms 41 to 46 are pivoted into the casing. Stop lever 92 can be actuated by mechanical (structual tension), pneumatic, hydraulic or electromagnetic devices, indicated at 94 in FIG. 6. This automatic control mechanism 94 is in working connection with the other stop lever end 92b. It is also possible to use an operating mechanism 94, which is transmitter-controlled.

Casing 15 with base disc 20, rotating disc 30 and anti-skid arms 41 to 46, as well as pivoted levers 51 to 56 can be constructed as a single unit, which is then fixed to rim 11 using wheel nuts as indicated in FIG. 8. It is also possible for fixing to take place by means of cover plates to the rim openings. The construction of FIG. 8 permits a subsequent fitting of the anti-skid device according to the invention to commercial rims. In this case the operating mechanism 94 for returning the rotating disc 30 is connected by means of a feedline 95 with a switching mechanism arranged on a vehicle dashboard, so that it is possible to operate rotating disc 30 from inside the vehicle, thereby giving the possibility of retracting the anti-skid arms 41 to 46 at any time. The anti-skid device is fixed to rim 11 by means of base disc 20 mounted on the screws on rim 11 and tightened by means of wheel nuts.

In the embodiment of FIG. 7 the anti-skid device forms an integrated part of the rim and namely in such a way that base disc 20 simultaneously constitutes the front rim disc. Rotating disc 30 is then held and rotated in rotary manner on the rim which is constructed as a base disc.

The outside of rotating disc 30 can be constructed as a decorative cap.

Due to the resilient-elastic construction of each anti-skid arm 41 to 46 the end areas thereof adapt to the particular tyre profile, independently of the deformation of the tyre. FIGS. 7 and 8 show at A the deformation of the anti-skid arm in the case of an unloaded tire, with at B the adaptation thereof in the case of a loaded tire. Furthermore the end position of each anti-skid arm 41 to 46 is limited by means of stop cams 38 provided on rotating disc 30 (FIG. 2).

Figure 9:
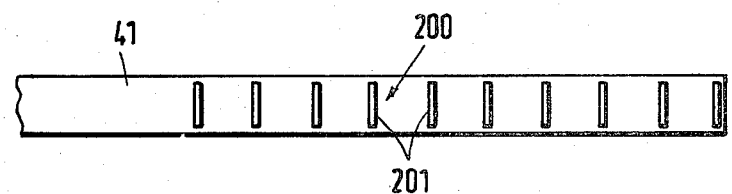
FIG. 9 an anti-skid arm with a profile body in a view of the surface facing the tire tread.
Figure 10:
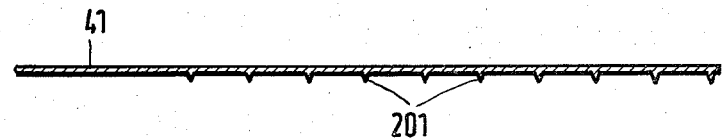
FIG. 10 a side view of the anti-skid arm of FIG. 9.
Figure 11:
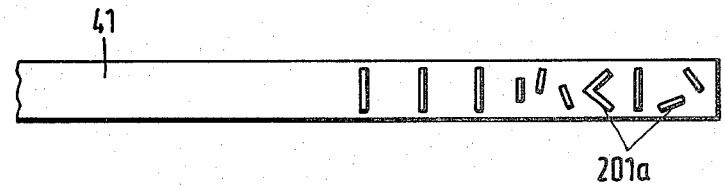
FIG. 11 a further embodiment of an anti-skid arm with a profile body in a view of the surface facing the tire tread.

In order to obtain the adhesion between anti-skid arms 41 to 46 and the tyre tread the end area of the arms facing the tread is provided with a figuring or profiling 200 (FIGS. 9 to 11), extending over the entire length of the engagement surface of each anti-skid arm with the tyre tread and the tire sidewall, is made from rubber or synthetic materials and is in the form of profile bodies 201. The latter can be constructed as raised ribs running at right angles to the longitudinal direction of the anti-skid arm and are fitted to the latter (FIGS. 9 and 10). Furthermore profile sections 201a can be attached to the anti-skid arms 41 to 46 in such a way that they engage in the tire profile, i.e. into the profile grooves of said profile, so that the anti-skid arms are secured to the tire when said arms are in the operating position. The latter embodiment is particularly advantageous in the case of tires with large post profiles, such as e.g. winter tires.

The invention is not limited to the embodiments described and represented hereinbefore and various modifications can be made thereto without passing beyond the scope of the invention.

What is claimed is:

1. An anti-skid mechanism for a vehicle wheel which includes a wheel rim having an axis of rotation comprising: a first member affixed to said wheel and extending generally transversely relative to said wheel axis; a second member axially spaced from said first member on a side thereof opposite said wheel and also extending generally transversely relative to said axis; means for rotating said second member relative to said first member about said axis; a plurality of anti-skid arms pivotally mounted on said first member; and lever means pivotally mounted between each of said anti-skid arms and said second member to drive said anti-skid arms between an operative position and an inoperative position by rotation of said second member relative to said first member.

2. An anti-skid mechanism according to claim 1 wherein said anti-skid arms occupy the space between said first and said second members when moved to said inoperative position.

3. An anti-skid device according to claim 1 wherein said anti-skid arms are made of resilient material and include anti-skid portions on the outermost ends thereof, said anti-skid portions being brought to and from position radially adjacent the circumferentially outermost surface of said vehicle wheel by resilient action of said anti-skid arms when said arms are moved between said operative and inoperative positions.

4. An anti-skid mechanism according to claim 1 wherein said anti-skid arms each comprise one end pivotally mounted to said first member and a second free end defining anti-skid portions adapted to become engaged between said vehicle wheels and a road surface when said anti-skid arms are in said operative position.

5. An anti-skid mechanism according to claim 1 wherein said lever means comprise a lever arm for each of said anti-skid arms, each of said lever arms having one end pivotally mounted to said second member and another end pivotally mounted intermediate the ends of one of said anti-skid arms.

6. An anti-skid mechanism according to claim 1 wherein said anti-skid arms and said lever means are each mounted for pivotal motion about axes which extend generally parallel to said axis of said wheel.

7. An anti-skid mechanism according to claim 1 further comprising means for manually rotating said second member relative to said first member.

8. An anti-skid mechanism according to claim 1 further comprising means for effecting rotation of said second member relative to said first member from a location remote from said vehicle wheel to which said anti-skid mechanism is attached.

9. An anti-skid device according to claim 1 wherein said first and said second members comprise disks which are rotatable about said axis of said wheel, said anti-skid mechanism further including tension springs connected to effect a spring biasing force tending to urge said second member toward the inoperative position of said anti-skid arms.

10. An anti-skid mechanism according to claim 1 further including stop means mounted on said first member and arranged within the path of movement of each of said anti-skid arms in order to limit the range of movement thereof toward the operative position of said arms.

11. An anti-skid mechanism according to claim 1 further comprising stop cams provided on said second member which limit the end position of each of said anti-skid arms.

12. An anti-skid device according to claim 1 further comprising manual operating means for rotating said second member to actuate said anti-skid arms between said operative and said inoperative positions, said manual operating means comprising means defining an aperture in said second member; gear crank means including gear means thereon adapted to be inserted through said aperture, a pitch circle rack provided in the region of said aperture on said base disk, said gear means being configured for meshing engagement with said pitch circle rack when said gear crank means is inserted through said aperture to effect rotation of said second member relative to said first member.

13. An anti-skid mechanism according to claim 1 further comprising automatic operating means for enabling actuation of said anti-skid arms between said operative and said inoperative positions by rotation of said second member, said automatic operating means comprising a pitch circle rack affixed to said second member on the side thereof facing said first member and located in the spacing therebetween, gear means extending through an aperature provided in said first member in the region of said rack, said gear means being connected to a drive mechanism mounted upon said wheel rim.

14. An anti-skid mechanism according to claim 9 wherein said tension spring means are connected between said first member and said second member.

15. An anti-skid mechanism according to claim 1 further comprising a stop cam member located on said second member facing toward said first member; and stop lever means pivotally supported upon said first member and having a lever end interacting with said stop cam member in order to hold said second member in the operative position of said anti-skid arms, said anti-skid mechanism further comprising spring means interposed between said first member and said second member applying a spring force tending to return said second member to the inoperative position of said anti-skid arms, said stop lever means and said stop cam means operating against said spring biasing force of said spring means, said stop lever means being operable to become disengaged with said stop cam means to permit said second member to return to said inoperative position of said anti-skid arms by operation of said spring means.

16. An anti-skid mechanism according to claim 15 further comprising means for enabling actuation of said stop lever means from a location remote from said vehicle wheel.

17. An anti-skid mechanism according to claim 1 wherein said anti-skid arms are removably mounted upon said first member in order to enable replacement thereof.

18. An anti-skid mechanism according to claim 1 wherein said first member, said second member, said anti-skid arms and said lever-means are formed as an assembled unit which may be attached and detached from said wheel rim.

19. An anti-skid mechanism according to claim 1 wherein said first member is rigidly joined with said wheel rim and constitutes a component of said wheel rim.

20. An anti-skid mechanism according to claim 1 further comprising bearing means interposed between said first member and said second member for enabling relative rotative motion therebetween.

21. An anti-skid mechanism according to claim 20 wherein said bearing means comprise ball bearings, and wherein said second member includes means defining a groove extending circumferentially thereabout, said first member being shaped to define a complementary groove located adjacent and opposite said groove in said second member, said groove in said second member and said complementary groove in said first member operating to receive therebetween in operative engagement said ball bearings.

22. An anti-skid mechanism according to claim 1 wherein said second member is constructed as a decorative wheel cap and is mounted on the exterior of said wheel.

23. An anti-skid mechanism according to claim 1 wherein each of said anti-skid arms consists of a half U-shaped bent spring steel blank.

24. An anti-skid mechanism according to claim 1 having six of said anti-skid arms arranged in an even angular distribution about said first member, said lever means comprising one lever pivotally mounted between said second member and a point intermediate one of said anti-skid arms for each of said anti-skid arms.

* * * * *